United States Patent [19]

Lichtenstein

[11] 4,135,064

[45] Jan. 16, 1979

[54] IMPEDANCE COMPENSATION OF TRANSMISSION LINE

[75] Inventor: Nachum Lichtenstein, Ottawa, Canada

[73] Assignee: Northern Telecom Limited, Montreal, Canada

[21] Appl. No.: 824,659

[22] Filed: Aug. 15, 1977

[51] Int. Cl.² .............................................. H04B 3/18
[52] U.S. Cl. ................................................ 179/170 G
[58] Field of Search .......... 179/170 R, 170 D, 170 G; 178/70 R, 70 TS; 333/80 T

[56] References Cited

U.S. PATENT DOCUMENTS

| | | | |
|---|---|---|---|
| 3,204,048 | 8/1965 | De Monte | 179/170 G |
| 3,303,437 | 2/1967 | De Monte | 179/170 G |
| 3,814,867 | 6/1974 | Boucher | 179/170 G |
| 3,860,767 | 1/1975 | Boucher et al. | 179/170 G |
| 3,927,280 | 12/1975 | Gupta et al. | 333/80 R |
| 3,989,906 | 11/1976 | Kiko | 179/170 R |
| 4,027,118 | 5/1977 | Poppe | 179/170 G |

Primary Examiner—Kathleen H. Claffy
Assistant Examiner—Randall P. Myers
Attorney, Agent, or Firm—Achmed N. Sadik

[57] ABSTRACT

An unconditionally stable impedance matching network for matching a nonloaded voice frequency transmission line to the standard impedance of a repeater on said line is provided.

9 Claims, 5 Drawing Figures

FIG. I

IMPEDANCE COMPENSATION OF TRANSMISSION LINE

FIELD OF THE INVENTION

The present invention relates to the repeatering of telephone transmission lines in general, and particularly to impedance matching of nonloaded telephone lines to standard impedance values.

BACKGROUND AND PRIOR ART OF THE INVENTION

For various reasons, such as expense, telephone operating companies often utilize nonloaded twisted wire pairs for the transmission of voice frequency (VF) signals. Beyond certain cable lengths it becomes necessary to insert repeaters in order to maintain adequate transmission levels at all frequencies of interest. Since the cable exhibits varying characteristic impedance with frequency while the repeaters usually have a constant in-and output impedance, it is necessary to convert the cable impedance to match that of the repeaters for proper operation of the total system.

U.S. Pat. No 3,814,867 issued June 4, 1974 to C. Wendell Boucher discloses an "Active Shunt Impedance For Compensating Impedance Of Transmission Line" suitable for the application at hand. However, the circuit taught therein exhibits instabilities in the form of undesired oscillations when connected for operation in telephone systems. Its utility for such applications is thus diminished. In a system where more than a single impedance matching device is necessary, spurious oscillations and instabilities, even though they may be outside the frequency band of operation, are not acceptable.

SUMMARY OF THE INVENTION

The present invention endeavours to provide an impedance matching network that, in addition to being an improvement on the prior art discussed in the patent to Boucher, supra, is stable under actual operating conditions. As mentioned above, this is particularly important if the system includes two or more matching networks and/or repeater. For instance, unless the repeater is located in the switching centre of the telephone company, where it is connected at one side thereof to a well-defined and matched impedance, it is necessary to use an impedance matching network on either side of the repeater.

The present invention, thus, provides an impedance matching network for a repeatered voice frequency transmission line comprising in combination a first pair of terminals for connection to a repeater, a second pair of terminals for connection to said transmission line, means for introducing two effective series resistances at predetermined frequencies between said first and second pairs of terminals without substantially affecting d-c current flow, passive impedance means coupled across said second pair of terminals, and active impedance means a-c coupled across said second pair of terminals, whereby said impedance matching network matches the impedance of said transmission line to the impedance of said repeater while maintaining stability.

From the following detailed description it will be recognized that in the above network the three basic elements coact to match the impedance of the transmission line to that of the repeater at voice frequencies and still maintain stability at all frequencies. In a preferable, narrower aspect of the invention, the means for introducing two effective resistances is a balanced transformer on a single core having two separate secondary windings interconnecting the appropriate terminals of the network and a separate primary winding having a resistor connected across it. It is also preferred that the active impedance means be a-c coupled to the second pair of terminals by means of a single isolation transformer.

BRIEF DESCRIPTION OF THE DRAWINGS

A preferred embodiment of the present invention will now be described in conjunction with the accompanying drawings in which.

DETAILED DESCRIPTION OF THE PREFERRED EMBODIMENT

Figure 1:
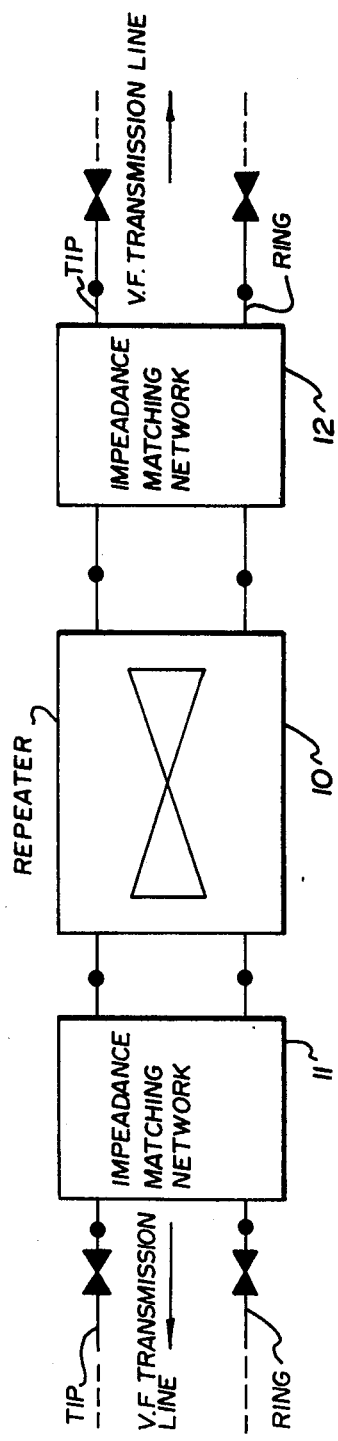
FIG. 1 is a block diagram illustrating how the impedance matching network is used in a VF transmission line.

FIG. 1 of the drawings illustrates the general use of the impedance matching network in a nonloaded VF transmission line. Such a transmission line consists of, as is well known, a twisted pair of conductors, one conductor designated TIP and the other RING. The integrity of the conductors must be maintained throughout for reasons of d-c (direct current) continuity. Repeater 10 is often a negative impedance repeater and must be matched to the transmission line bilaterally. Therefore, a pair of impedance matching networks 11 and 12 are placed on either side of the repeater 10. Should the repeater 10 be in switching office with one side connected to a matched impedance, only one impedance matching network on the transmission line side would be necessary.

Figure 2:
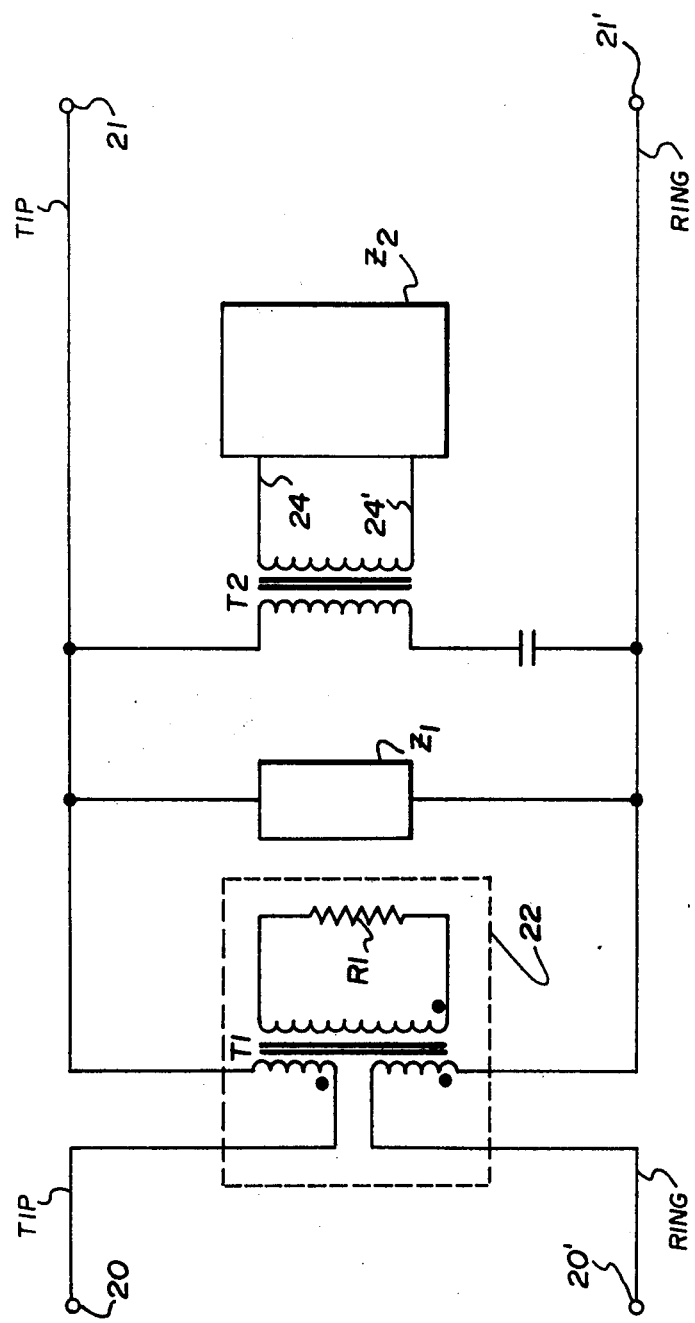
FIG. 2 is a block diagram of the impedance matching network.

Turning now to FIG. 2 of the drawings, the impedance matching network is shown with terminal 20 and 20' for connection to the repeater 10 and terminals 21 and 21' for connection to the transmission line. The network comprises a resistance insertion network 22 which consists of a balanced transformer T1 with the windings as shown in the drawing, and a resistor R1 connected to the primary winding of T1 while each of secondary windings connects the terminals 20/21 and 20'/21', respectively. The transformer T1 has sufficiently low inductance so as not to affect voice frequencies (i.e. ca. 300 to 3.4 KHz) substantially, yet enough to insert an effective series resistance (R1 transformed) at frequencies of 5 KHz and higher with each of the TIP and RING conductors. A suitable transformer ratio for T1 is 2:1 with the primary having an inductance of ca. 24mH and each of the secondaries being 6mH. A suitable value for R1 is 1 KOhm. The network in FIG. 2 further comprises a complex passive impedance Z1 coupled across the terminals 21 and 21' for matching the transmission line to the repeater 10 at the lower portion of the VF spectrum from appr. 200 Hz to 1 KHz. An isolation transformer T2 with preferably a 1:1 ratio of primary and secondary windings is connected with one of its windings across the terminals 21 and 21' and serves to couple an active complex impedance Z2 at voice frequencies thereacross. The impedance Z2, in cooperation with the insertion network 22, matches the transmission line to the repeater 10 at the higher portion of the VF spectrum without creating a device or total system instabilities either within or outside of the VF spectrum.

Figure 3:
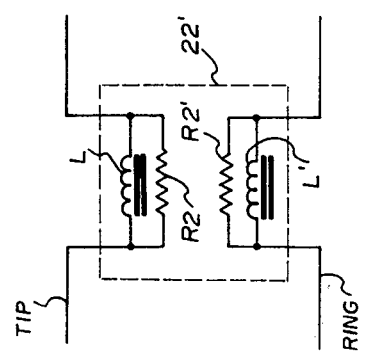
FIG. 3 is an alternative realization of a component of the impedance matching network of FIG. 2.

FIG. 3 of the drawings depicts an alternative to the insertion network 22 shown in FIG. 2. Insertion network 22' in FIG. 3 comprises a resistor R2 and a thereto shunted inductor L in series with the TIP conductor, and similarly R2' and L' in series with the RING conductor. The inductor L has sufficiently low inductance to act substantially as a short for VF frequencies.

Figure 4:
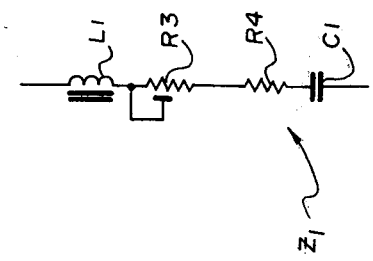
FIG. 4 is a detailed circuit of the impedance Z1 in FIG. 2.

FIG. 4 shows in detail the passive complex impedance Z1, which comprises a fixed inductor L1, a variable resistor R3, a fixed resistor R4 and finally a capacitor C. Suitable values are: L1 = 184mH; R3 = 10 KOhm; R4 = 510 Ohm; and C1 = 0.47 microfarads.

Figure 5:
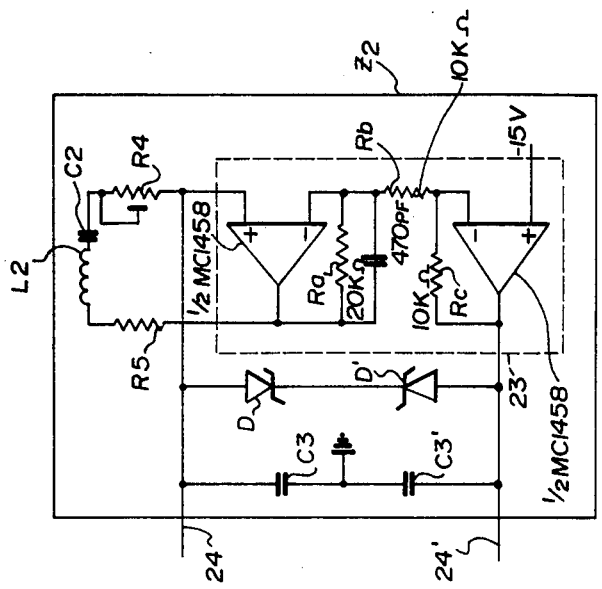
FIG. 5 is a detailed circuit of the impedance Z2 in FIG. 2.

Turning now to FIG. 5, the active complex impedance Z2 comprises a negative impedance converter 23 for converting the combined impedance of the series connection of a variable resistor, a capacitor C2, an inductor L2 and a fixed resistor R5, to its output leads 24 and 24' connected to the winding of the transformer T2. Two series capacitors C3 and C3', serving as impulse noise suppressors, the junction of which is grounded, are connected between the leads 24 and 24'. Also connected therebetween are two zener diodes D and D' in series for surge protection. The negative impedance converter 23 is the subject of a copending patent application in the name of T. Lewandowski and assigned to the same assignee as the present application. Component values in the negative impedance converter 23 suitable for the present preferred embodiment are given in FIG. 5 of the drawings. Reference is given to the above-mentioned copending application for understanding of the improved negative impedance converter 23. However, it is necessary to give here the condition for the stability of the active complex impedance Z2. The feedback factor F of the negative impedance converter 23 and associated circuitry is as follows:

$$F = 1 - \frac{R_b|Z_s| - |Z_f|(R_a + R_c)}{A(|Z_s| + |Z_f|)(R_a + R_b)}$$

where: $R_a$, $R_b$ and $R_c$ are resistors associated directly with the negative impedance converter 23 as shown in FIG. 5; A is the open loop gain factor of the operational amplifier MC1458; $Z_s$ is the equivalent source impedance appearing between the leads 24 and 24'; and $Z_f$ is the total impedance of the series feedback elements $R_4$, $C_2$, $L_2$ and $R_5$. Hence, stability is always guaranteed if $|Z_f|(R_a + R_c) > R_b|Z_s|$. For a better understanding of stability criteria of negative impedance converters reference is given to Chapter 7, p.208 in a book by S.S. Hakim titled: "Junction Transistor Circuit Analysis", published by John Wiley & Sons, Inc., 1962.

Since such devices tend to become unstable at frequencies above VF, the inclusion of the inductor L2 (1mHenry is sufficient) in $Z_f$ fulfills the above condition at such frequencies, without major effect in the VF range.

Suitable values are as follows:
C3, C3' = 1000 picofarads;
R4 = 1KOhms;
R5 = 200 Ohms; and
L2 = 1mH.

C2 is chosen practically to yield the best match (highest return loss) measured across the terminals 21 and 21' (TIP and RING) under actual operating conditions. The value, depending on the length and gauge of the VF transmission line to be matched would vary from a few thousand picofarads to fractions of microfarads. The variable resistor R4 is also adjusted for best match with the impedance matching network in situ. With the herein given component values a match is easily achieved to 900 Ohms plus 2.15 microfarads in series.

What is claimed is:

1. An impedance matching network for a repeatered non-loaded voice frequency transmission line comprising, in combination: a first pair of terminals for connection to a repeater; a second pair of terminals for connection to said transmission line; means for introducing two effective series resistances at predetermined frequencies one each between each of said first and second pairs of terminals without substantially affecting d-c current flow; passive impedance means coupled across said second pair of terminals; and a negative impedance converter for converting the impedance of a series connection of a resistor, a capacitor and an inductor, the converter impedance being a-c coupled across said second pair of terminals; whereby said impedance matching network matches the impedance of said transmission line to the impedance of said repeater while maintaining stability.

2. The impedance matching network of claim 1, said means for introducing two effective resistances being a balanced transformer on a single core having two separate secondary windings, one in series with the TIP conductor and the other in series with the RING conductor of said transmission line, and a primary winding having a resistor connected thereacross.

3. The impedance matching network of claim 2, said active impedance means being coupled across said second pair of terminals by means of an isolation transformer.

4. The impedance matching network of claim 3, said passive impedance means being a series connection of a resistor, a capacitor and an inductor.

5. The impedance matching network of claim 3, said repeater being a negative impedance repeater.

6. The impedance matching network of claim 2, said passive impedance means being a series connection of a resistor, a capacitor and an inductor.

7. The impedance matching network of claim 2, said repeater being a negative impedance repeater.

8. The impedance matching network of claim 1, said passive impedance means being a series connection of a resistor, a capacitor and an inductor.

9. The impedance matching network of claim 1, said repeater being a negative impedance repeater.

* * * * *